No. 826,402. PATENTED JULY 17, 1906.
J. G. CAMPAU.
NUT LOCK.
APPLICATION FILED NOV. 4, 1905.

Inventor
Julian G. Campau

Witnesses
Phil O. Barnes
John F. Byrne

By Victor J. Evans
Attorney

UNITED STATES PATENT OFFICE.

JULIAN G. CAMPAU, OF MONROE, MICHIGAN.

NUT-LOCK.

No. 826,402. Specification of Letters Patent. Patented July 17, 1906.

Application filed November 4, 1905. Serial No. 285,883.

*To all whom it may concern:*

Be it known that I, JULIAN G. CAMPAU, a citizen of the United States, residing at Monroe, in the county of Monroe and State of Michigan, have invented new and useful Improvements in Nut-Locks, of which the following is a specification.

My invention relates to nut-locks; and its primary object is to provide a novel and highly-useful device of this character wherein the nut is securely locked upon the bolt and wherein the washer for locking the nut upon the bolt has such engagement with the nut that all liability of the washer becoming longitudinally displaced and the consequent unlocking of the bolt is obviated.

A further object of the invention is to provide a nut-lock which is simple, durable, and effective, one which may be easily applied and removed, and one which may be manufactured and sold at a comparatively low cost.

With the above and other objects in view the invention consists in the construction, combination, and arrangement of parts hereinafter fuly described, claimed, and illustrated in the accompanying drawings, wherein—

Figure 1:
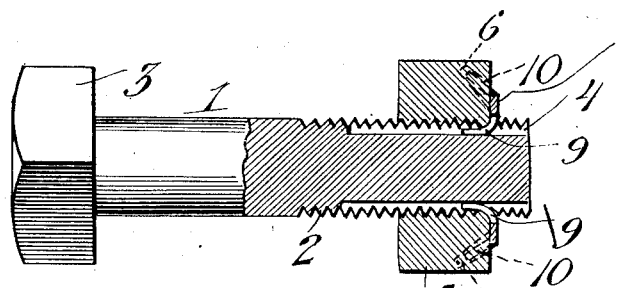
Figure 2:
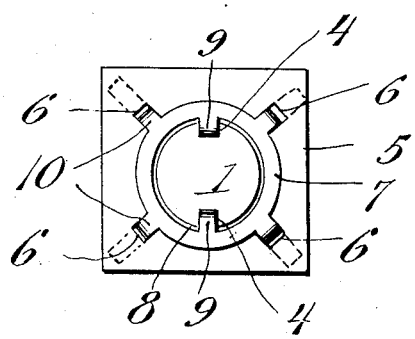
Figure 3:
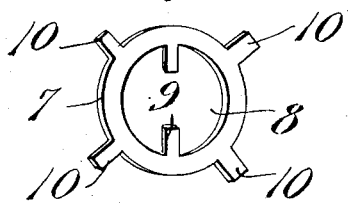

Figure 1 is a view in side elevation, illustrating the application of my improved lock, the bolt being partially in longitudinal section to illustrate fully the manner in which the nut-lock engages the bolt. Fig. 2 is a view in end elevation, and Fig. 3 is a detail perspective view of the nut-lock.

Referring to the drawings by reference-numerals, 1 designates a bolt provided with the usual threaded portion 2 and head 3. The threaded portion 2 is provided with two longitudinally-extending and diametrically-opposed grooves 4.

5 designates the nut, the same being provided with the usual bolt-receiving opening and having its outer face provided with a number of retaining-sockets 6. The sockets 6 are radially arranged and inclined outwardly and downwardly and provided with enlarged entrances, as is fully illustrated in dotted lines in Fig. 1 of the drawings.

7 designates a washer provided with a bolt-receiving opening 8 and fitted over the projecting end of the bolt 1. The washer 7 is provided with two diametrically-opposed locking-stems 9, said stems being bent at right angles with relation to the washer and positioned in the grooves 4 of the bolt 1, whereby to prevent the washer from turning on the bolt. The washer 7 is also provided with a plurality of radially-extending nut-engaging stems 10, said stems being arranged at approximately acute angles with relation to the washer 7. The nut-engaging stems 10 are forced into the sockets 6, and in view of the angular disposition of said sockets 6 all liability of the washer 7 becoming longitudinally displaced, and the consequent unlocking of the bolt, is obviated. The acute-angular disposition of the nut-engaging stems with relation to the washer 7 and the enlargement of the entrances of the sockets 6 of the nut adapt the stems 10 to be easily guided into the sockets 6.

The nut 5 is first applied to the bolt 1, and after the stems 9 and 10 of the washer 7 are properly bent the same is mounted upon the projecting end of the bolt 1 and the stems 9 caused to engage in the grooves 4 and the stems 10 caused to engage in the sockets 6.

It is apparent from the above description, taken in connection with the accompanying drawings, that I provide a nut-lock wherein the nut is securely locked upon the bolt and wherein the washer is firmly secured upon the bolt against longitudinal displacement. It is further apparent that the washer 7 may be easily and quickly applied and removed and that it may be manufactured and sold at a comparatively low cost.

Having fully described and illustrated my invention, what I claim is—

1. In a device of the character described, the combination with a bolt provided with a groove, a nut provided with an outwardly and downwardly inclined retaining-socket in the face thereof, and a locking-washer provided with a stem engaging in the groove of the bolt and with a stem engaging in the retaining-socket of the nut, the inclination of the retaining-socket permitting the stem to be easily inserted therein and preventing the accidental withdrawal of the stem therefrom.

2. In a device of the character described, the combination with a bolt provided with a groove, a nut provided with an outwardly and downwardly inclined retaining-socket in the face thereof, said socket being provided with an enlarged entrance, and a locking-washer provided with a stem engaging the groove of the bolt and with a stem engaging in the retaining-socket of the nut, the inclination and the enlarged entrance of the retaining-socket permitting the stem to be easily inserted therein and the inclination of said socket preventing the accidental withdrawal of the stem therefrom.

3. In a device of the character described, the combination with a bolt, a nut provided with an outwardly and downwardly inclined retaining-socket in the face thereof, and a locking-washer having interlocking engagement with the bolt and provided with a stem engaging in the retaining-socket, the inclination of the retaining-socket permitting the stem to be easily inserted therein and preventing the accidental withdrawal of the stem therefrom.

In testimony whereof I have affixed my signature in presence of two witnesses.

JULIAN G. CAMPAU.

Witnesses:
P. B. LORANGER,
ALFRED J. NADEAU.